US006764568B1

(12) United States Patent
Sud

(10) Patent No.: US 6,764,568 B1
(45) Date of Patent: Jul. 20, 2004

(54) THREE-DIMENSIONAL DECORATION WITH RAISED IMAGE AND FILLER

(76) Inventor: Alexander M. Sud, 3704 Sudbury La., Louisville, KY (US) 40220

( * ) Notice: Subject to any disclaimer, the term of this patent is extended or adjusted under 35 U.S.C. 154(b) by 0 days.

(21) Appl. No.: 10/374,237

(22) Filed: Feb. 25, 2003

Related U.S. Application Data

(60) Division of application No. 10/133,017, filed on Apr. 26, 2002, now Pat. No. 6,625,914, which is a continuation-in-part of application No. 09/951,172, filed on Sep. 13, 2001, now Pat. No. 6,651,370.
(60) Provisional application No. 60/233,182, filed on Sep. 15, 2000.

(51) Int. Cl.$^{7}$ .......................... B29C 41/00; B32B 27/00; B32B 27/40

(52) U.S. Cl. ....................... 156/245; 156/242; 156/277; 264/101; 264/129; 264/132; 264/259; 264/267

(58) Field of Search ................................ 156/245, 242, 156/277; 264/101, 129, 132, 259, 267

(56) References Cited

U.S. PATENT DOCUMENTS

| | | | | |
|---|---|---|---|---|
| 861,822 | A | | 7/1907 | Feher |
| 2,183,426 | A | | 8/1939 | Hart |
| 2,538,085 | A | | 1/1951 | Cotton |
| 2,631,046 | A | | 3/1953 | Stephens |
| 2,643,899 | A | | 6/1953 | Cavalero |
| 2,869,651 | A | | 6/1959 | Baldanza |
| 2,946,137 | A | | 7/1960 | Worth et al. |
| 3,057,097 | A | | 10/1962 | Douglas |
| 3,310,321 | A | | 3/1967 | Freund |
| 3,321,860 | A | | 5/1967 | Dichtl et al. |
| RE26,948 | E | | 9/1970 | Klein |
| 3,758,358 | A | | 9/1973 | Kuroda |
| 3,798,806 | A | | 3/1974 | Sanford |
| 3,972,417 | A | | 8/1976 | Iten et al. |
| 4,215,499 | A | | 8/1980 | Wilson |
| 4,380,128 | A | | 4/1983 | Ichikawa |
| 4,477,243 | A | | 10/1984 | Wallsten |
| 4,555,423 | A | | 11/1985 | Sands |
| 4,579,708 | A | | 4/1986 | Rosart |
| 4,737,329 | A | | 4/1988 | Rakoczy |
| 4,779,734 | A | | 10/1988 | Kydonieus |
| 4,840,275 | A | | 6/1989 | Faiola et al. |
| 4,841,651 | A | | 6/1989 | Conner |
| 4,951,404 | A | | 8/1990 | Lithwick |
| 4,979,619 | A | | 12/1990 | Hager |
| 5,001,853 | A | | 3/1991 | Odien |
| 5,119,574 | A | | 6/1992 | King |
| 5,181,745 | A | | 1/1993 | Jacobsen et al. |
| 5,199,745 | A | | 4/1993 | Balsamo |
| 5,201,548 | A | | 4/1993 | Lang et al. |
| 5,217,162 | A | | 6/1993 | Shibahara |
| 5,345,705 | A | | 9/1994 | Lawrence |
| 5,377,836 | A | | 1/1995 | Eisenbraun |
| 5,379,886 | A | | 1/1995 | Brauner et al. |
| 5,600,939 | A | | 2/1997 | Giovannone |
| 5,879,028 | A | | 3/1999 | Benoit |
| 5,960,527 | A | * | 10/1999 | Ellison et al. ................ 29/428 |
| 6,106,023 | A | | 8/2000 | Sud et al. |
| 6,117,384 | A | * | 9/2000 | Laurin et al. ............ 364/297.2 |

FOREIGN PATENT DOCUMENTS

| | | |
|---|---|---|
| CH | 19847 | 4/1900 |

* cited by examiner

*Primary Examiner*—Stephen J. Lechert, Jr.
(74) *Attorney, Agent, or Firm*—Camoriano and Associates; Theresa Fritz Camoriano

(57) ABSTRACT

A decoration includes a thin cover sheet onto which an image has been printed and which has been formed into a contoured shape at least partially corresponding to the image. A filler support layer is added to the hollow side of the cover sheet and hardens.

14 Claims, 3 Drawing Sheets

THREE-DIMENSIONAL DECORATION WITH RAISED IMAGE AND FILLER

This application is a divisional of Ser. No. 10/133,017, now U.S. Pat. No. 6,625,914, filed Apr. 26, 2002, which is a continuation-in-part of Ser. No. 09/951,172, now U.S. Pat. No. 6,651,370, filed Sep. 13, 2002, which claims priority from U.S. Provisional Application S.No. 60/233,182, filed Sep. 15, 2001, all of which are hereby incorporated by reference.

BACKGROUND OF THE INVENTION

Relief images are well-known and have been made of clay, wood, plastic and other materials. A typical relief image is either cast or carved, and, if it includes a variety of colors, they usually are painted on by hand. One way to make an attractive relief image is to run a relatively thin plastic material through a printing device to create a high quality printed image and then to vacuum form the material to give relief to the image. However, in order to run the material through a printer, it must be relatively thin. This results in a fairly lightweight, flexible product, which does not have the same aesthetic appeal as a more solid cast or carved image. As shown in my U.S. Pat. No. 6,106,023, which is hereby incorporated by reference, one way to protect the flexible image from being damaged is to provide a cover and a raised frame around the image. However, since the image is on a lightweight, flexible sheet, it can easily flex, and it does not have the same effect as a solid or cast piece. Similarly, as one picks up the image, the relative lack of weight gives away the fact that this is not a solid or cast piece. The more rigid the relief image is and the heavier it feels, the more it resembles a cast, carved, or solid piece, and the higher its perceived quality and value by the end user.

SUMMARY OF THE INVENTION

The present invention provides a plaque, wall hanging, or other decoration in which the hollow side of a thin, printed and formed member is filled with a filler, which hardens, thereby imparting structural strength. The filler may fill the hollow side of the member by any number of means, including casting, pouring, or injection molding. In the preferred embodiment, the filler is poured into the hollow side of the formed member. As the filler solidifies, the thin, printed and formed member preferably bonds with the filler to make a solid three-dimensional piece. This piece may be mounted to a frame, such a solid wooden frame, a frame may be part of the piece itself, or the piece may be unframed. The result is a heavy duty, attractive decoration having a raised, printed image. The decoration may be further personalized by attaching an engraved, brass tag or a label, or by other known means.

DESCRIPTION OF THE PREFERRED EMBODIMENT

Figure 1:
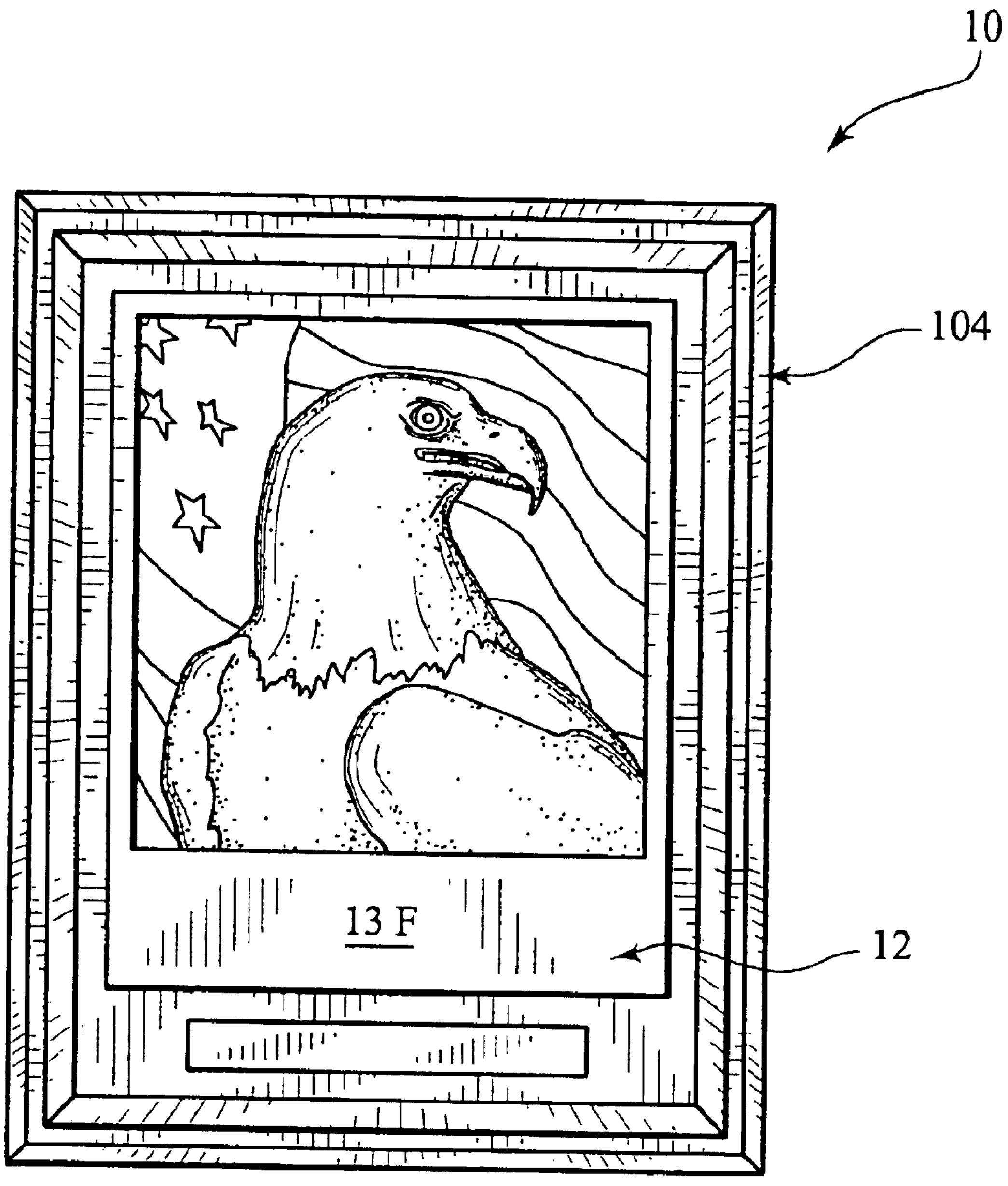
FIG. 1 is a front view of a raised image plaque made in accordance with the present invention.
Figure 2:
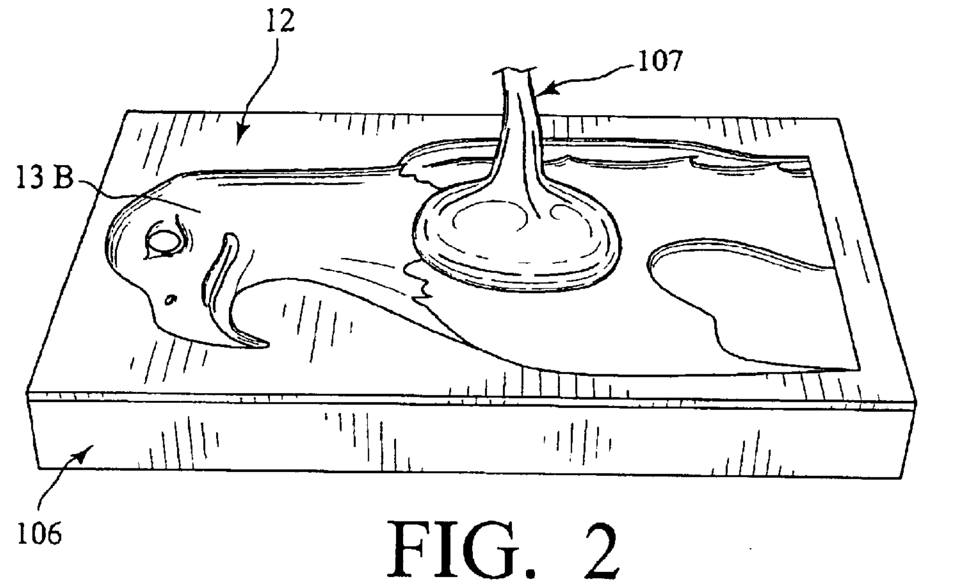
FIG. 2 is a perspective view of the back side of the raised image portion of the plaque of FIG. 1, resting on a support member and being filled with a filler.
Figure 3:
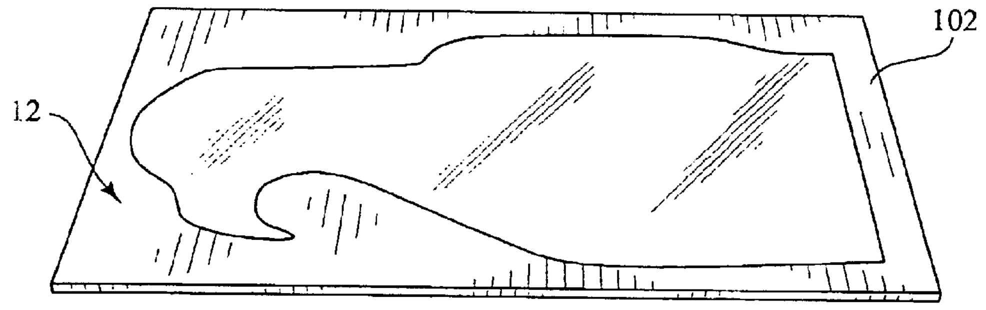
FIG. 3 is a perspective view of the raised image portion of the plaque of FIG. 2 after it has been filled.

FIGS. 1–5 show an example of a raised, three-dimensional decorative plaque 10 made in accordance with the present invention. As shown in FIGS. 1 and 3, this particular embodiment 10 comprises three pieces: a pre-printed, vacuum-formed cover sheet 12; a filler 102; and a frame 104. In this embodiment, the cover sheet 12 is formed by vacuum forming, and the frame 104 is injection molded.

The cover sheet 12 is printed and is then vacuum formed with contours corresponding to the image. The outside or front surface 13F is substantially convex, and the inside or back surface 13B is substantially concave (See FIGS. 2 and 5). In this preferred embodiment, the cover sheet 12 is made of 0.20-inch thick styrene. The printing preferably is done on a machine in which the printed, precut sheet 12 is fed through the printer. It may be desired to print a marble design or another type of attractive design in the frame area 20 of the printed sheet 12 and to print an image to be formed as a relief image in the central area 22. The cover sheet 12 is then vacuum formed or formed by another known method to provide a formed, relief image 24 in the central area 22. The formed cover sheet includes contours corresponding to the printed image. The forming process also forms rearwardly-directed edges 26 around the periphery, which terminate in a flange or lip 28 which flares out approximately perpendicular to the rearwardly-directed edges 26. A raised frame 20 may also be formed on the cover sheet 12 between the rearwardly-directed edges 26 and the formed, raised image 24. The depth of the raised image portion (in this embodiment the image is an eagle) is typically on the order of approximately one-eighth to one-half inch, and preferably about one-fourth of an inch. The depth of the cover sheet from the flange 28 to the most raised portion of the image is typically on the order of approximately one inch. Each portion of the cover sheet 12 may be printed differently, as desired, to produce an attractive product. For example, the central area 22 may be printed with a portrait or a landscape image (such as the eagle in this example), and the frame portion 20 may be printed with a marbelized design. While this preferred embodiment shows a rectangular-shaped cover sheet 12, it is understood that the plaque can be made in a variety of shapes, such as oval, hexagonal, circular, and so forth.

A support layer 106 (See FIG. 2) is used to support the thin, formed sheet 12 as it is being filled with a filler. The support layer 106 preferably is made of thicker material and is formed in substantially the same shape as the printed and formed cover sheet 12. This support layer 106 is typically a rubber support matting, though it may be any other type of support material, such as compacted sand, for instance. The printed and formed cover sheet 12 rests face-down on, and is supported by, the support layer 106 such that the convex front, printed surface 13F of the raised image 12 lies against the support layer 106, and the concave rear surface 13B of the raised image 12 (which is the hollow or concave surface of the raised image 12) is facing up.

A filler material 102 is then added to the substantially concave rear surface 13B of the image, preferably until the entire rear surface area 13B is filled. In other embodiments of this invention, it may be desirable to allow the filler 102 to overflow beyond the hollow surface 13B of the raised image 12, and allow the filler to reach the rearwardly directed edges 26 (See FIG. 5). In fact, it may be desirable to fill the entire rear surface of the raised image 12 until the filler is even with the flanges 28. The more filler added, the heavier the final piece will be.

As shown in the figures, the vacuum formed contours are in registration with the image so as to form a contoured relief image. In FIG. 2, the thin sheet 12 is oriented with the front surface down and the concave rear surface up, and filler 102 is simply pored into the open cavity formed by the concave rear surface of the thin sheet 12. The rear surface is not enclosed in a mold which would permit high pressure injection molding of the filler but rather simply is open to the atmosphere, so the filler 102 is applied at ambient pressure.

The flanges 28 help to prevent the filler 102 from getting between the piece 12 and the support layer. Once the filler 102 has cured and solidified, the piece 12 is removed from the support layer 106, and any excess material such as the flanges 28 and parts of the rearwardly directed edges 26 may be trimmed so as to obtain a substantially smooth and flat back surface of the raised image 12, as shown in FIG. 3.

Figure 4:
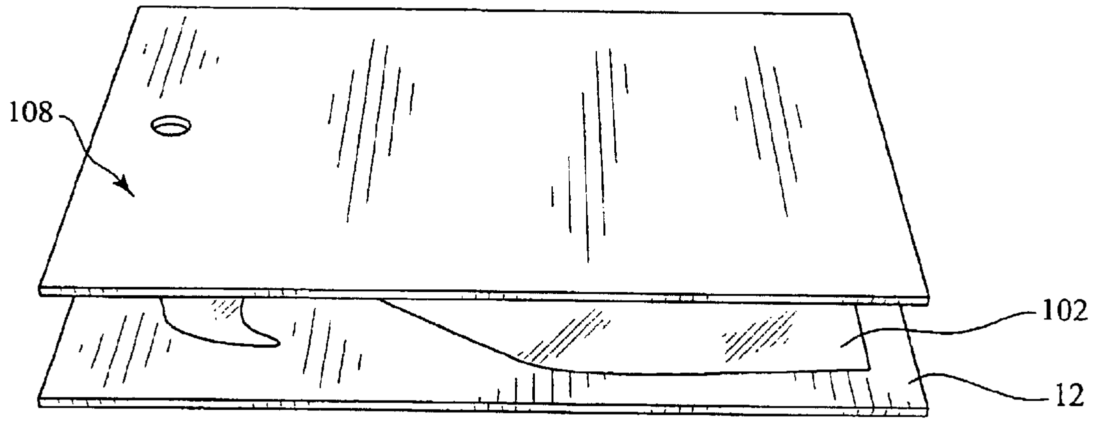
FIG. 4 is an exploded, perspective view of the filled, raised image portion of the plaque of FIG. 3 with a backer portion added.
Figure 5:
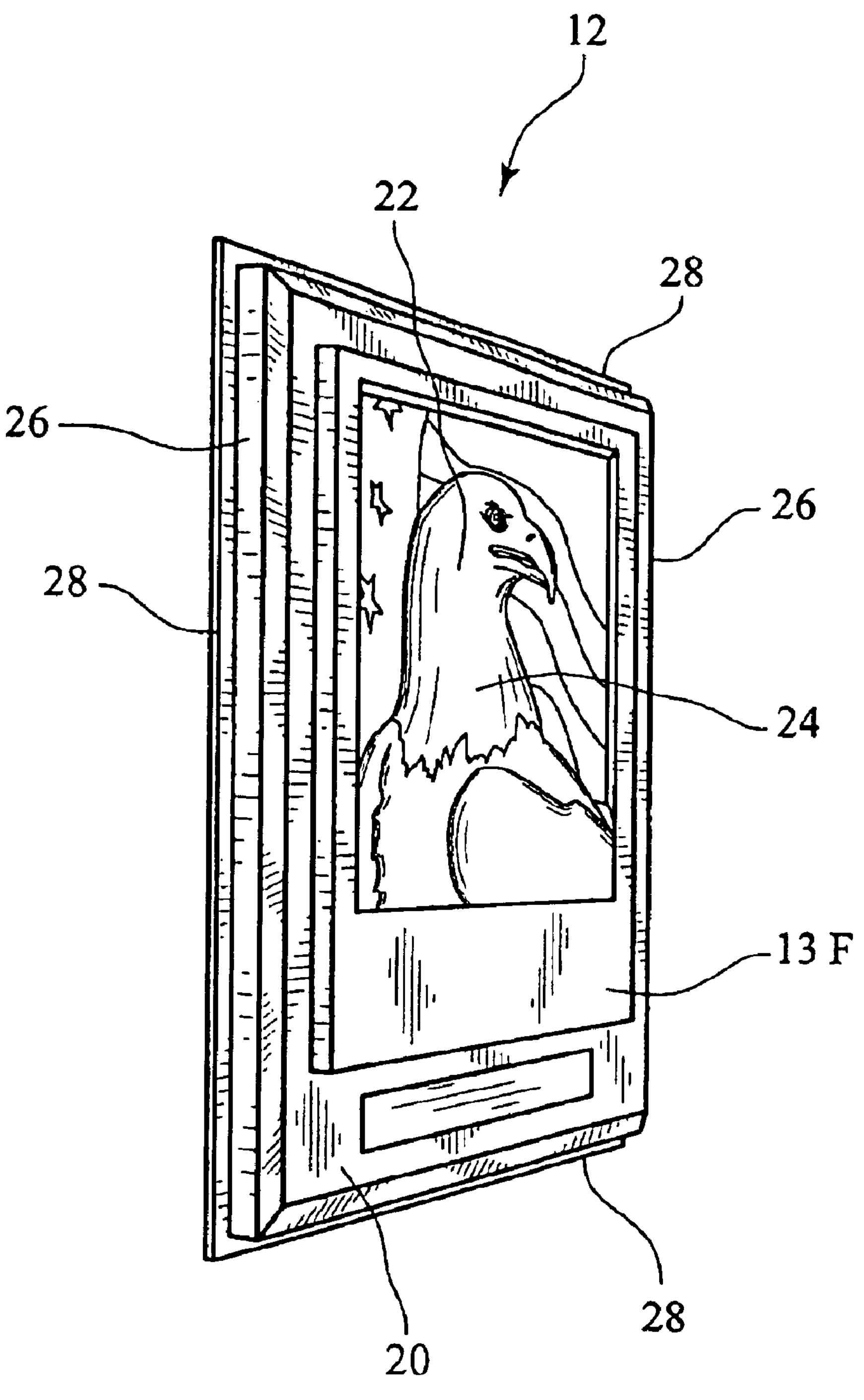
FIG. 5 is a perspective view of the raised image portion of the plaque of FIG. 1.

A backing member 108 of relatively flat material is secured to the back of the raised printed image 12, as shown in FIG. 4. Alternately, the raised printed image 12 shown in FIG. 3 may be secured (with an adhesive, for instance) to a separate frame 104 as seen in FIG. 1. Finally, it may be that neither a backing member 108 nor a separate frame 104 is desirable or required.

The filler 102 is preferably a polyurethane resin or a white gypsum cement such as Hydrocal (Hydrocal is a registered trademark product of United Sates Gypsum of 125 South Franklin, Chicago, Ill. 60606-4678). The filler 102 does not require high temperature curing (such as curing in an oven), which would tend to damage the raised printed image 12. Instead, the filler 102 hardens at room temperature. However, the hardening process of the filler may result in an exothermic reaction, and this temperature rise may cause slight melting or dissolving of the material from which the raise printed image 12 is made (which, as disclosed earlier is preferably a relatively thin styrene). This results in a good bond between the filler 102 and the raised printed image 12. However, this bond is not a requirement. Should the filler 102 and the raised printed image 12 not form a good bond during the hardening process of the filler 102, and should such a bond be deemed desirable, the corresponding surfaces of the hardened filler 102 and of the raised image 12 may be secured to each other via an adhesive, for instance.

The significance of the support layer 106 is now evident. If the filler slightly dissolves or slightly melts the inside surface 13B of the relatively thin raised printed image 12, and this raised printed image 12 is not properly supported, the image 12 may warp, damaging the end product. The support layer 106 provides support to prevent warping of the printed image 12 while the filler is being added and is curing.

It will be obvious to those skilled in the art that modifications may be made to the embodiment described above without departing from the scope of the present invention.

What is claimed is:

1. A method for making a decoration, comprising the steps of:

printing an image onto a front face of a thin sheet of material;

vacuum forming said thin sheet so that said front face becomes substantially convex, thereby forming a substantially concave back face;

adding non-solid filler to said substantially concave back face; and allowing said filler to solidify.

2. A method for making a decoration as recited in claim 1, and further comprising the step of laying said front face of said thin sheet on a support which substantially follows the contour of said front face prior to adding the non-solid filler.

3. A method for making a decoration as recited in claim 2, and further comprising the step of removing said thin sheet and filler from said support layer once said filler has solidified.

4. A method for making a decoration as recited in claim 3, and further comprising the step of mounting a frame onto said thin sheet.

5. A method for making a decoration as recited in claim 1, wherein said filler comprises a polymer.

6. A method for making a decoration as recited in claim 1, wherein said filler comprises polyurethane resin.

7. A method for making a decoration as recited in claim 1, wherein said filler comprises gypsum cement.

8. A method for making a decoration as recited in claim 1, wherein said filler is added at ambient pressure.

9. A method for making a decoration as recited in claim 8, wherein said vacuum forming forms a relief image with contours in registration with the printed image.

10. A method for making a decoration as recited in claim 9, wherein said filler is adhered to said back face.

11. A method for making a decoration, comprising the steps of:

printing an image onto a first face of a thin sheet of material;

vacuum forming said thin sheet to form a substantially convex front face and a substantially concave rear face, wherein said vacuum forming forms a relief image with contours in registration with the printed image;

adding non-solid filler to said substantially concave rear face at ambient pressure; and allowing said filler to solidify.

12. A method for making a decoration as recited in claim 11, and further comprising the step of laying said front face of said thin sheet on a support which substantially follows the contour of said front face prior to adding the non-solid filler.

13. A method for making a decoration as recited in claim 12, wherein said filler is adhered to said back face.

14. A method for making a decoration as recited in claim 11, wherein said first face on which said image is printed is said front face.

* * * * *

UNITED STATES PATENT AND TRADEMARK OFFICE

CERTIFICATE OF CORRECTION

PATENT NO. : 6,764,568 B1
DATED : July 20, 2004
INVENTOR(S) : Alexander M. Sud

It is certified that error appears in the above-identified patent and that said Letters Patent is hereby corrected as shown below:

<u>Column 1,</u>
Line 7, delete “September 13, 2002” and insert therefor -- September 13, 2001 --.
Line 9, delete “September 15, 2001” and insert therefor -- September 15, 2000 --.

Signed and Sealed this

Twenty-third Day of November, 2004

JON W. DUDAS
*Director of the United States Patent and Trademark Office*